May 27, 1952          O. BUTLER          2,598,348

CONTROL SYSTEM FOR TAXICAB METERS

Filed Nov. 8, 1948

INVENTOR.
Oscar Butler
BY
ATTORNEY

Patented May 27, 1952

2,598,348

UNITED STATES PATENT OFFICE 2,598,348

CONTROL SYSTEM FOR TAXICAB METERS

Oscar Butler, Kansas City, Mo.

Application November 8, 1948, Serial No. 58,887

2 Claims. (Cl. 180—82)

This invention relates to a control system for use with taxicabs in the nature of an electric circuit coupled in series with the ignition circuit of the taxicab and operably connected with the meter thereof for automatically forcing the driver of the taxicab to place the meter in operation whenever a passenger occupies the taxicab.

The primary object of this invention is to improve upon my co-pending application entitled "Load Capacity Controller," filed February 11, 1948, under Serial No. 7,697, and since abandoned, this application being a continuation in part of the aforesaid pending application.

The most important object of this invention is to provide a taxicab meter control system having a plurality of normally closed switches within the ignition circuit of the taxicab and mounted within the passenger seats of the taxicab for movement to an open position, thereby de-energizing the ignition circuit, whenever a passenger occupies one of said seats, the ignition circuit and said switches being coupled electrically and mechanically with the taxicab meter, forcing the driver to move the flag of the meter to a position rendering the meter operable in order to reclose the ignition circuit, whereby he may proceed with his passenger.

Another important object of this invention is to provide circuit elements coupled in the ignition circuit and operable when a passenger leaves the taxicab seat to again de-energize the ignition circuit until such time as the driver returns the meter flag to an inoperative or "Vacant" position.

A further object of this invention is to provide a control system for taxicab meters as above set forth having a number of electrical circuits in series with the ignition circuit, one of the circuits having interposed therein a relay for de-energizing the ignition circuit whenever a passenger leaves the taxicab, the plurality of make and break mechanisms within the passenger seats being so arranged as to force the taxicab driver to direct a passenger to the rear seat of the taxicab before permitting a passenger to occupy the front seat thereof.

Other objects of the present invention include the way in which a conventional taxicab meter is motivated to operate in conjunction with the electrical circuits hereof; the way in which a specially-formed switch is provided for mounting within the passenger seats and operation thereby through compression of the seats by the weight of the occupant thereof; and the manner in which the entire system is formed and arranged to permit mounting of the essential component parts in the taxicab with appropriate locks or seals to prevent tampering therewith.

Many more minor objects will be made clear as the following specification progresses, reference being had to the accompanying drawing, wherein.

It is well known by those having had experience in the taxicab business that one of the greatest financial losses to the owner of such business lies in the way in which the individual drivers steal money belonging to the company by failure to render the registering meter operable when transporting a passenger in the taxicab.

Since the company itself has no practical way of knowing the total proceeds received by a given driver except by the amount registered on the meter, it is a simple matter to leave the meter flag in the "Vacant" position because of the fact that the passengers usually are not concerned or are unaware of the practice that is predominant among taxicab drivers.

Figure 4:
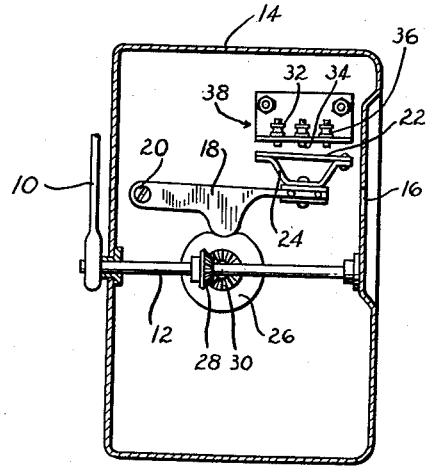
Fig. 4 is a vertical, cross sectional view through a taxicab meter, showing portions of the component parts thereof, together with one of the multiple switch means of the circuit shown in Fig. 1.

A conventional taxicab meter is shown fragmentarily in Fig. 4 of the drawing and includes a flag, the arm 10 of which is connected to a rotatable shaft 12, traversing case 14 of the meter. The flag, of course, carries such wording as "For Hire" or "Vacant," which is displayed prominently when the flag is in the uppermost position illustrated in Fig. 4 of the drawing.

Operably connected with such flag and with the shaft 12 is a panel having the words "Not Registering" inscribed thereon, said panel being movable to and from a position in alignment with an opening 16 within the front face of the case 14. Such "Not Registering" panel is normally mounted upon one end of a swingable arm 18 opposite to pivotal point 20 for arm 18.

For the purposes of this invention, such panel has been entirely removed and an elongated contact bar 22 substituted therefor. This contact bar 22 is suitably secured to the arm 18 by means of a bracket 24. Swinging movement on the substantially horizontal axis 20 is imparted to the arm 18 by a cam member 26 mounted upon a shaft shown indistinctly behind shaft 12. A pair of intermeshing bevel gears 28 and 30 are mounted upon each of said shafts respectively.

When the arm 10, having the meter flag thereon, is moved from the position shown in Fig. 4 of the drawing to rotate interconnected shafts, cam member 26 will cause upward movement to be imparted to the arm 18 to move the contact bar 22 into bridging relationship with three stationary contacts 32, 34 and 36. This entire switch, including a movable contact bar 22 and stationary contacts 32, 34 and 36, is broadly designated by the numeral 38.

Figure 1:
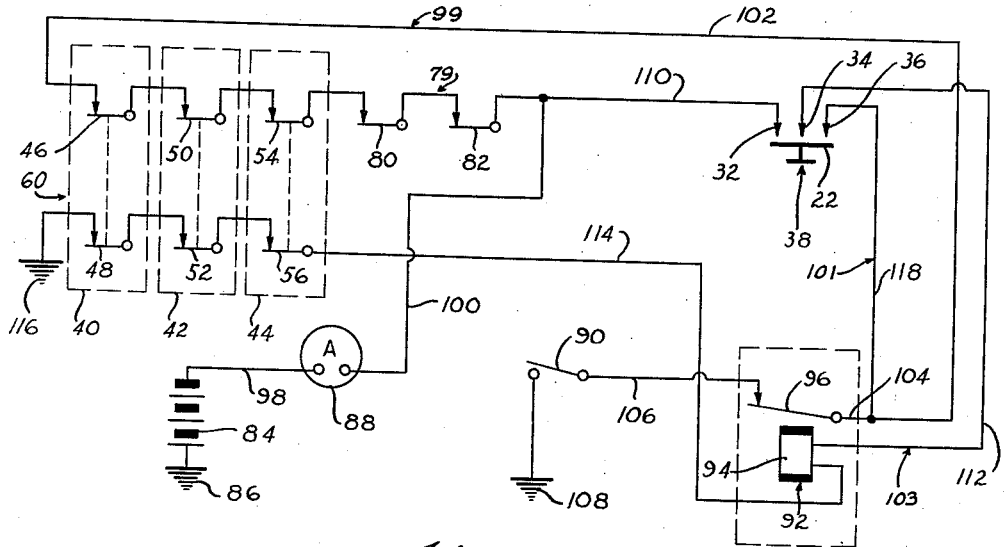
Fig. 1 is a schematic wiring diagram, showing the electrical circuit forming a part of the control system for taxicab meters made in accordance with the present invention.
Figure 3:
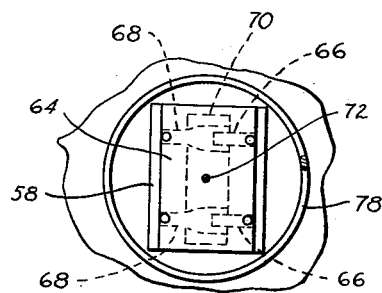
Fig. 3 is a top plan view of one of said switches, per se.

A plurality of switches mounted within the rear seat of the taxicab are arranged in pairs designated by the numerals 40, 42 and 44, respectively. As shown in Figs. 1 and 3, these switches 40, 42 and 44 each include a pair of shiftable contacts and a corresponding pair of stationary contacts. The individual switches of each pair thereof are ganged together, the switches of the assembly 40 being designated by the numerals 46 and 48, the switches of assembly 42 being designated by the numerals 50 and 52 and the switches of the assembly 44 being numbered 54 and 56, respectively.

Figure 2:
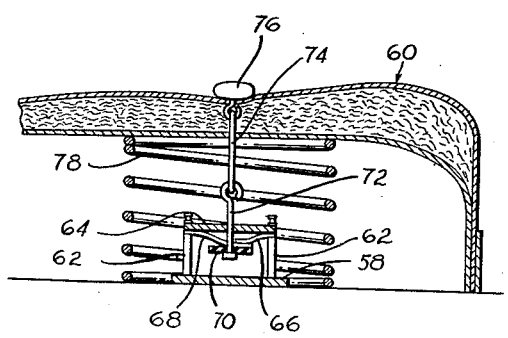
Fig. 2 is a fragmentary, sectional view through a conventional automobile seat, showing one of the switches mounted therein in vertical cross section.

The precise construction of these assemblies 40, 42 and 44 is shown in Figs. 2 and 3. A stationary plate 58 is secured in any suitable manner to the bottom of the rear seat 60 of the taxicab, said plate 58 having a plurality of upstanding posts 62. A second plate 64 is secured to the uppermost ends of the posts 62, and each of the switches 46, 48, 50, 52, 54 and 56 includes a stationary contact 66 and an opposed, movable contact 68.

These contacts 66 and 68 are secured between the uppermost ends of corresponding posts 62 and the plate 64 and extend inwardly into a relative overlapping condition. The contacts 68 are all formed from resilient material and biased away from the opposed stationary contact 66. An elongated bar 70 of non-conducting material underlies the pair of movable contacts 68 in bridging relationship thereto, this bar 70 having connected therewith a link 72 that passes upwardly through an opening in plate 64 for free, sliding movement.

A second link 74 interconnects the link 72 with a button 76 forming a part of the seat 60. As illustrated, the seat 60 is of the usual compressible type and has a plurality of coil springs 78 mounted therein. The links 72 and 74 are co-axially disposed with one of the coil springs 78 and the latter serves to normally hold the movable contacts 68 biased in a normally closed position, as illustrated in Fig. 2 of the drawing.

The six switches within the rear seat 60 of the taxicab are equally spaced longitudinally along the seat 60, to the end that at least one pair of the assemblies 40, 42 or 44 will move simultaneously to an open position when a passenger occupies seat 60. It is apparent that the inherent weight of such passenger will compress seat 60 to move links 72, 74 and bar 70 downwardly to permit opening of the two contacts 66—68.

For reasons hereinafter to be made clear, the passenger side of the front seat of the taxicab (designated generally in Fig. 1 by the numeral 79) is provided merely with a pair of switches 80 and 82 formed essentially the same as the switches shown in Figs. 2 and 3, with the exception only that the same are not of double character.

In addition to electrical components thus far described, the entire circuit arrangement illustrated in Fig. 1 of the drawing includes the automobile battery 84, grounded as at 86 in the usual manner, an ammeter 88, ignition switch 90 and a relay broadly designated by the numeral 92. This relay 92 includes an electromagnet 94 and a normally closed switch 96.

The ammeter 88 is connected in series to one side of the battery 84 by line 98. The switches 46, 50, 54, 80 and 82 are connected in series and joined all on one side thereof by means of wire 100 to the opposite side of ammeter 88. The opposite side of the just-mentioned switches are connected by means of wires 102 and 104 to one side of the relay switch 96.

The opposite side of switch 96 is coupled by means of wire 106 to one side of the ignition switch 90, the opposite side of the ignition switch 90 being directed to the automobile ignition system (not shown), ultimately grounded as at 108. The series connected switches 46, 50, 54, 80 and 82, as well as the ammeter 88, are coupled in series with stationary contact point 32 of switch 38 by means of a line 110.

The stationary contact point 34 of switch 38 is joined by wire 112 to one side of the coil 94 of relay 92. The opposite side of coil 94 has connection by wire 114 to one side of series connected switches 48, 52 and 56. The opposite side of these three last-mentioned switches is grounded at 116. The stationary contact point 36 of switch 38 has connection by wire 118 with the switch 96 of relay 92, this contact point 36, also, being in series with the lines 102 and 104 that connect switches 46, 50, 54, 80 and 82 with the switch 96.

Assuming the ignition switch 96 to be closed and the meter flag in the "Vacant" position with switch 38 open, a circuit 99 for operating the taxicab, and which constitutes part of the ignition circuit therefor, is traceable as follows:

From battery 84 through wire 98, ammeter 88, wire 100, normally closed switches 82, 80, 54, 50 and 46, wires 102 and 104, normally closed switch 96 of relay 92, wire 106 and ignition switch 90 to ground 108.

Accordingly, when a passenger moves to a position upon rear seat 60 of the taxicab, one of the switches 46, 50 or 54 will move to an open position, breaking the above-traced circuit 99. This circuit 99 will, also, be broken if a passenger is loaded in the front seat of the taxicab by reason of the fact that either switch 80 or 82 will move to the open position. Such loading of the taxicab, in either case, will force the driver to move the meter flag on arm 10 to the "Occupied" position, closing the switch 38.

In the event that the rear seat 60 only or both the rear and front seats of the taxicab are thus loaded, a secondary ignition circuit 101, with switches 38 and 90 both closed is traced as follows:

From battery 84 through wire 98, ammeter 88, wires 100 and 110, contact point 32 of switch 38, contact 22, contact 36, wires 118 and 104, switch 96, wire 106 and switch 90 to ground 108.

It is to be noted at this juncture that the switch 96 of relay 92 will remain in the closed position because of the fact that occupancy of the rear seat 60 of the taxicab will open one of the switches 48, 52 or 56 to maintain the coil 94 of relay 92 de-energized.

In the event, however, the taxicab driver attempts to load only the front seat of the taxicab, then only switch 80 or 82 will open and the switches 48, 52 and 56 will remain closed. With a passenger in the front seat only of the taxicab, closing of switch 38 will not permit energization of the taxicab ignition circuit 99. Instead, closing of switch 38 in an attempt to close the ignition circuit 99 because of the open condition of either switch 80 or 82 will energize relay 92 and open switch 96 thereof within the ignition circuit 99.

The circuit 103 for energizing coil 94 in this manner is traceable as follows:

From battery 84 through wire 98, ammeter 88, wires 100 and 110, contact points 32, 22 and 34, wire 112, relay 94, wire 114 and switches 56, 52 and 48 to ground 116.

Thus, the only way the driver can proceed, whether the meter flag is in the "Vacant" or the "Occupied" position, is to move the passenger from the front seat to the rear seat or to load at least one other passenger in the rear seat of the taxicab.

Assuming the taxicab driver is about to deliver either a passenger from the rear seat of the taxicab or from both the rear and front seats thereof, it is obvious that the moment such passengers move from the taxicab, all of the switches in both seats will return automatically to the normally closed position. The ignition circuit 99 will thereupon become immediately de-energized as long as the switch 38 remains in the closed position because of the fact that the flag of the meter is still in the "Occupied" position.

Before the driver can proceed to solicit another passenger, he must move the meter flag to the "Vacant" position to open switch 38. The circuit 99 from battery 84 through ammeter 88 and switches 82, 80, 54, 50 and 46 is broken because of the fact of the open condition of switch 96. Switch 96 being open, also, prevents closing of circuit 103 traced from battery 84 through ammeter 88 and contact points 32, 22 and 36 of switch 38.

The switch 96 is open because of the circuit 103 traceable through coil 94 from battery 84 through ammeter 88, closed switch 38, coil 94 and closed switches 56, 52 and 48 to ground 116. Accordingly, as soon as passengers of the taxicab are delivered, the driver must open switch 38 by moving the meter flag to the "Vacant" position. With such opening of switch 38, relay 92 becomes de-energized, and the ignition circuit 99 is again closed as initially set forth above when the ignition switch 99 is in the closed position.

Since all of the switches forming a part of the assemblies 40, 42 and 44, as well as the individual switches 80 and 82, are imbedded within the seat assemblies of the taxicab, any tampering therewith will readily become apparent to the owner. By the same token, the switch 38 is sealed within the meter itself and cannot be tampered with by the taxicab driver without detection by the owner.

It is desirable, also, to mount the relay 92 in the taxicab in a manner such as by a lead seal, to the end that the owner may know if a driver attempts in any way to render the system inoperable.

Except for the minor alteration of the meter, as above set forth and as shown in Fig. 4 of the drawing, the entire system may be made a part of existing taxicabs without appreciable alteration of the ignition circuit thereof. By the same token, the entire system may be installed in the taxicab at the time of its manufacture without an appreciable addition of cost.

Actual use of the system has proved its value, and the difficulties heretofore experienced with respect to dishonesty on the part of the drivers has been overcome.

Having thus described my invention, what I claim as new and desire to secure by Letters Patent is:

1. In a taxicab having a passenger seat, an ignition circuit, and a meter provided with a flag movable to and from a position for rendering said meter operable; a control system comprising at least one pair of normally closed switches disposed adjacent said seat for movement to and an open position by a passenger as the latter occupies said seat; an electric circuit having a normally open make and break mechanism therein, one of said switches and said mechanism being in series with said ignition circuit, said mechanism being operably connected with said flag for movement to a closed condition when the flag is moved to said meter-operating position, whereby to energize the ignition circuit while said passenger is on the seat; and structure operably joined with the other of said switches for breaking the ignition circuit upon movement of the passenger from said seat while the flag is in said position, said structure including an electric circuit in series with said other switch and having a relay therein, said relay including make and break mechanism disposed in the ignition circuit.

2. In a taxicab having a battery, a compressible front seat, a compressible rear seat, and a meter having manually operable parts, a control system comprising a first and a second normally closed, rear seat switch, both disposed within the rear seat and connected thereto for opening as a passenger sits on the rear seat and compresses said rear seat; a normally closed, front seat switch disposed within the front seat and connected thereto for opening as a passenger sits on the front seat and compresses said front seat; a normally open meter switch having a first, a second, and a third stationary contact and a movable contact connected with said parts of the meter; a relay having a coil and a normally open relay switch; a first electrical circuit connected with said battery and having said relay switch coupled in series therein; a second electrical circuit coupled in parallel with said first circuit and having said first and said second stationary contact, and said coil coupled in series therein; and a third electrical circuit coupled in parallel with said first and said second circuit and having said first and said third stationary contact, and said relay switch therein, said first rear seat switch and said front seat switch being coupled in series in said first circuit, and said second rear seat switch being coupled in series in said second circuit whereby, when a passenger is seated on the rear seat, said first circuit opens and said third circuit may be closed only by operation of said meter parts to close the movable contact against said stationary contacts, and whereby, when a passenger is seated on said front seat only, said first circuit opens and said coil is energized through the second circuit to open the relay switch, and thereby the third circuit, when the movable contact is closed.

OSCAR BUTLER.

REFERENCES CITED

The following references are of record in the file of this patent:

UNITED STATES PATENTS

| Number | Name | Date |
|---|---|---|
| 1,491,329 | Alter | Apr. 22, 1924 |
| 1,541,544 | Weiss | June 9, 1925 |
| 1,717,602 | Goodspeed | June 18, 1929 |
| 1,878,596 | Papaefthemeou | Sept. 20, 1932 |
| 2,194,273 | Booth | Mar. 19, 1940 |